(12) United States Patent
Wilkins (10) Patent No.: US 8,891,616 B1
(45) Date of Patent: Nov. 18, 2014

(54) METHOD AND APPARATUS FOR ENTROPY ENCODING BASED ON ENCODING COST

(75) Inventor: Paul Wilkins, Cambridge (GB)

(73) Assignee: Google Inc., Mountain View, CA (US)

( * ) Notice: Subject to any disclaimer, the term of this patent is extended or adjusted under 35 U.S.C. 154(b) by 400 days.

(21) Appl. No.: 13/191,998

(22) Filed: Jul. 27, 2011

(51) Int. Cl.
*H04N 7/26* (2006.01)

(52) U.S. Cl.
USPC ................................. 375/240.03

(58) Field of Classification Search
CPC ......... H04N 11/04; H04N 7/12; H04N 11/02; H04N 19/00; H04N 7/26; H04N 19/0009; H04N 19/190096; H04N 19/00545; H04N 19/00175; H04N 19/00169; H04N 7/26079; H04N 7/26085; H04N 7/2609; H04N 7/26095; H04N 7/26101; H04N 7/26106; H04N 7/26111; H04N 7/26606; H04N 7/3027; H04N 7/325; H04N 7/5006; H04N 7/5013
USPC ................................. 375/240.03
See application file for complete search history.

(56) References Cited

U.S. PATENT DOCUMENTS

| | | | |
|---|---|---|---|
| 4,710,810 A | 12/1987 | Koga | |
| 5,150,209 A | 9/1992 | Baker et al. | |
| 5,461,423 A | 10/1995 | Tsukagoshi | |
| 5,650,782 A | 7/1997 | Kim | |
| 5,686,962 A | 11/1997 | Chung et al. | |
| 5,708,473 A | 1/1998 | Mead | |
| 5,767,909 A | 6/1998 | Jung | |
| 5,777,680 A | 7/1998 | Kim | |
| 5,818,536 A | 10/1998 | Morris et al. | |
| 5,886,652 A | 3/1999 | Adachi et al. | |
| 6,157,326 A | 12/2000 | Van Der Vieuten et al. | |
| 6,256,423 B1 | 7/2001 | Krishnamurthy et al. | |
| 6,414,995 B2 | 7/2002 | Okumura et al. | |
| 6,418,166 B1 | 7/2002 | Wu et al. | |

(Continued)

FOREIGN PATENT DOCUMENTS

| | | |
|---|---|---|
| EP | 1351510 | 10/2003 |
| EP | 1768415 | 3/2007 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Jay Patel
*Assistant Examiner* — Francis G Geroleo
(74) *Attorney, Agent, or Firm* — Young Basile Hanlon & MacFarlane P.C.

(57) ABSTRACT

Systems, methods, and apparatuses for compressing a video signal are disclosed. In one embodiment the method includes transforming at least a portion of the video signal to produce matrices of transform coefficients, dividing the transform coefficients by at least one quantizer value to generate matrices of quantized transform coefficients, and identifying an encoding context including the transformed portion of the video signal. The method may further include determining a cost to entropy encode a non-zero value occurring within the encoding context, determining a first range including zero and having a width that is a function of the determined cost to entropy encode a non-zero value, and setting to zero at least one transform coefficient that falls within the first range.

20 Claims, 9 Drawing Sheets

(56) References Cited

U.S. PATENT DOCUMENTS

| | | |
|---|---|---|
| 6,434,197 B1 | 8/2002 | Wang et al. |
| 6,473,463 B2 | 10/2002 | Agarwal |
| 6,501,860 B1 | 12/2002 | Charrier et al. |
| 6,522,784 B1 | 2/2003 | Zlotnick |
| 6,856,701 B2 | 2/2005 | Karczewicz et al. |
| 6,907,079 B2 | 6/2005 | Gomila et al. |
| 6,917,651 B1 | 7/2005 | Yoo et al. |
| 6,985,527 B2 | 1/2006 | Gunter et al. |
| 7,010,032 B1 | 3/2006 | Kikuchi et al. |
| 7,085,425 B2 | 8/2006 | Christopoulos et al. |
| 7,263,125 B2 | 8/2007 | Lainema |
| 7,432,329 B2 | 10/2008 | Haubennestel et al. |
| 7,496,143 B2 | 2/2009 | Schwarz et al. |
| 7,843,998 B2 | 11/2010 | Bjontegaard |
| 8,200,033 B2 | 6/2012 | Mietens et al. |
| 8,254,700 B1 | 8/2012 | Rastogi |
| 8,265,162 B2 | 9/2012 | Tian et al. |
| 8,270,738 B2 | 9/2012 | Raveendran et al. |
| 8,311,119 B2 | 11/2012 | Srinivasan |
| 8,331,444 B2 | 12/2012 | Karczewicz et al. |
| 8,344,917 B2 | 1/2013 | Misra et al. |
| 8,374,445 B2 | 2/2013 | Benndorf |
| 8,401,083 B2 | 3/2013 | Crotty et al. |
| 2001/0022815 A1 | 9/2001 | Agarwal |
| 2002/0009153 A1 | 1/2002 | Jeon et al. |
| 2002/0036705 A1 | 3/2002 | Lee et al. |
| 2002/0071485 A1 | 6/2002 | Caglar et al. |
| 2002/0080871 A1 | 6/2002 | Fallon et al. |
| 2003/0081850 A1 | 5/2003 | Karczewicz et al. |
| 2003/0215018 A1 | 11/2003 | MacInnis et al. |
| 2004/0013308 A1 | 1/2004 | Jeon et al. |
| 2004/0120398 A1 | 6/2004 | Zhang et al. |
| 2004/0131117 A1 | 7/2004 | Sheraizin et al. |
| 2004/0234144 A1 | 11/2004 | Sugimoto et al. |
| 2005/0152459 A1 | 7/2005 | Lobo et al. |
| 2005/0180500 A1 | 8/2005 | Chiang et al. |
| 2005/0276323 A1 | 12/2005 | Martemyanov et al. |
| 2006/0001557 A1 | 1/2006 | Liao |
| 2006/0098738 A1 | 5/2006 | Cosman et al. |
| 2006/0126724 A1* | 6/2006 | Cote et al. .............. 375/240.03 |
| 2007/0025441 A1 | 2/2007 | Ugur et al. |
| 2007/0177673 A1 | 8/2007 | Yang |
| 2008/0181299 A1 | 7/2008 | Tian et al. |
| 2008/0240250 A1* | 10/2008 | Lin et al. .............. 375/240.18 |
| 2008/0310503 A1 | 12/2008 | Lee et al. |
| 2008/0310745 A1 | 12/2008 | Ye et al. |
| 2010/0054328 A1 | 3/2010 | Nozawa |
| 2010/0097250 A1 | 4/2010 | Demircin et al. |
| 2010/0098169 A1 | 4/2010 | Budagavi |
| 2010/0104021 A1 | 4/2010 | Schmit |
| 2010/0290568 A1 | 11/2010 | Suzuki et al. |
| 2010/0322306 A1* | 12/2010 | Au et al. .............. 375/240.03 |
| 2011/0026591 A1 | 2/2011 | Bauza et al. |
| 2011/0080946 A1 | 4/2011 | Li et al. |
| 2011/0304634 A1 | 12/2011 | Urbach |
| 2012/0020408 A1 | 1/2012 | Chen et al. |
| 2012/0140822 A1 | 6/2012 | Wang et al. |
| 2012/0170647 A1* | 7/2012 | He et al. .............. 375/240.03 |
| 2012/0236931 A1 | 9/2012 | Karczewicz et al. |
| 2012/0243605 A1 | 9/2012 | Turlikov et al. |
| 2012/0314760 A1* | 12/2012 | He .............. 375/240.02 |
| 2012/0328026 A1 | 12/2012 | Sole Rojals et al. |
| 2013/0027230 A1 | 1/2013 | Marpe et al. |

FOREIGN PATENT DOCUMENTS

| | | |
|---|---|---|
| EP | 2235950 | 10/2010 |
| JP | 61092073 | 5/1986 |
| JP | 2217088 | 8/1990 |
| JP | 2272970 | 11/1990 |
| JP | 8280032 | 10/1996 |
| JP | 09247682 | 9/1997 |
| JP | 11262018 | 9/1999 |
| JP | 11289544 | 10/1999 |
| JP | 11313332 | 11/1999 |
| JP | 11513205 | 11/1999 |
| JP | 2002141806 | 5/2002 |
| JP | 2003046944 | 2/2003 |
| JP | 2003235044 | 8/2003 |
| KR | 100213018 | 8/1999 |
| KR | 200130916 | 4/2001 |
| WO | WO0150770 | 7/2001 |
| WO | WO03026315 | 3/2003 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, An Open Source Video Codec for the Web". Dated Jul. 11, 2011.

Mozilla, "Introduction to Video Coding".

Park, Jun Sung, et al., "Selective Intra Prediction Mode Decision for H.264/AVC Encoders", World Academy of Science, Engineering and Technology 13, (2006).

Bankoski et al. "VP8 Data Format and Decoding Guide" Independent Submission. Dated Nov. 2011.

Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.

\* cited by examiner

METHOD AND APPARATUS FOR ENTROPY ENCODING BASED ON ENCODING COST

TECHNICAL FIELD

The present invention relates in general to encoding and decoding and in particular to entropy encoding and decoding of video.

BACKGROUND

Digital video streams typically represent video using a sequence of frames (i.e. still images). An increasing number of applications today make use of digital video stream encoding for purposes other than traditional moving pictures (such as movies and video clips). For example, screen capture and screen casting applications generally represent the output of a computer monitor over time as a digital video stream, irrespective of the specialized nature of the content of the monitor. Typically, screen capture and screen casting digital video streams are encoded using video encoding techniques like those used for traditional moving pictures. To permit transmission of digital video streams while limiting bandwidth consumption, a number of video compression schemes have been devised.

SUMMARY

Embodiments of systems, methods, and apparatuses for encoding and decoding a video signal are disclosed herein. One aspect of the disclosed embodiments is a method of transforming at least a portion of the video signal to produce a matrices of transform coefficients, dividing the transform coefficients by at least one quantizer value to generate matrices of quantized transform coefficients, and identifying an encoding context including the transformed portion of the video signal. The method further includes determining the cost to entropy encode a non-zero value occurring within the encoding context, using a processor to determine a first range including zero and having a width that is a function of the determined cost to entropy encode a non-zero value, and setting to zero at least one transform coefficient that falls within the first range.

Another aspect of the disclosed embodiments is an apparatus for compressing a video signal. The apparatus comprises a memory and at least one processor configured to execute instructions stored in the memory to transform at least a portion of the video signal to produce a matrices transform coefficients, divide the transform coefficients by at least one quantizer value to generate matrices of quantized transform coefficients and identify an encoding context including the transformed portion of the video signal. The processor is further configured to determine the cost to entropy encode a non-zero value occurring within the encoding context, determine a first range including zero and having a width that is a function of the determined cost to entropy encode a non-zero value and set to zero at least one transform coefficient that falls within the first range.

Another aspect of the disclosed embodiments is a system for compressing a video signal. The system includes means for transforming at least a portion of the video signal to produce a matrices transform coefficients, means for dividing the transform coefficients by at least one quantizer value to generate matrices of quantized transform coefficients and means for identifying an encoding context including the transformed portion of the video signal. The system also includes means for determining the cost to entropy encode a non-zero value occurring within the encoding context, means for determining a first range including zero and having a width that is a function of the determined cost to entropy encode a non-zero value and means for setting to zero at least one transform coefficient that falls within the first range.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

Digital video streams can include formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

Video compression can be used to reduce the volume of bits needed to transmit, store or otherwise represent digital video. Video compression schemes may use various techniques to achieve improved compression efficiency. Applying a transform to image data can have benefits in representing and manipulating image features such as motion, frequency, brightness and color. Transforms accept as input a block or matrix of image data and produce as output a matrix of transform coefficients. Once the image data is transformed, it is compressed by a quantizer. Increased video compression can be achieved by entropy encoding the transform coefficients, e.g. with an optimized coding width or cost per bit, as disclosed herein.

Figure 1:
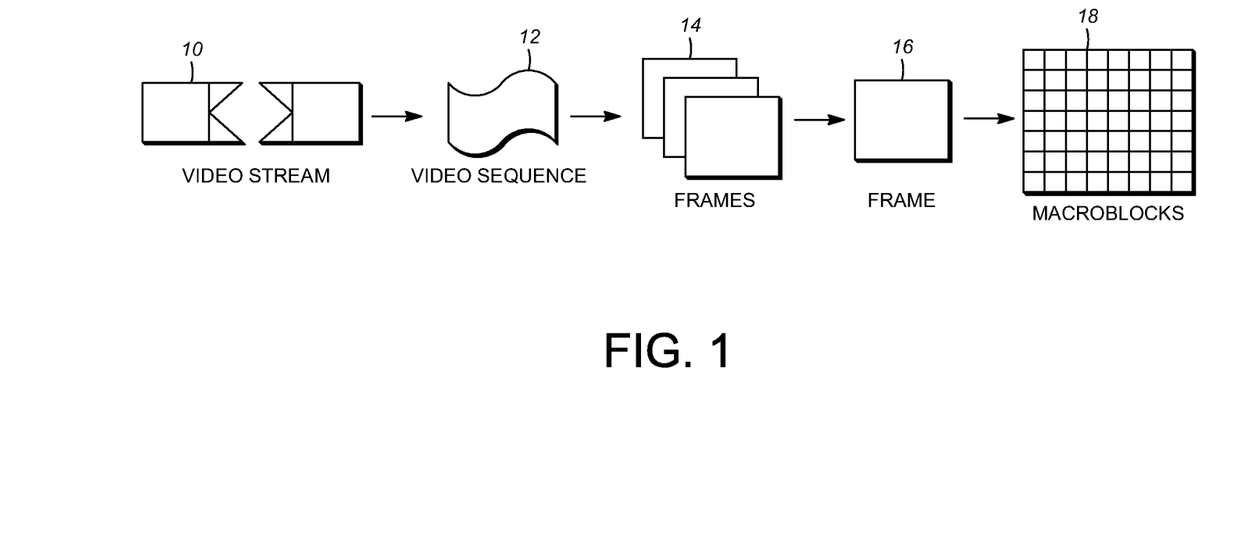
FIG. 1 is a diagram of a typical video bitstream to be encoded and decoded.

FIG. 1 is a diagram of a typical video stream 10 to be encoded and decoded. Video coding formats, such as VP8 or H.264, provide a defined hierarchy of layers for a video stream. The video stream 10 includes a video sequence 12. At the next level, the video sequence 12 includes a number of adjacent frames 14. While three frames are depicted as the adjacent frames 14, the video sequence 12 can include any number of adjacent frames 14. The adjacent frames 14 can then be further subdivided into a single frame 16. At the next level, frame 16 can be divided into a series of macroblocks 18, which can contain data corresponding to, for example, a 16×16 pixel group of displayed pixels in the frame 16. Each macroblock 18 can contain luminance and chrominance data for the corresponding pixels. The macroblocks 18 can also be of any other suitable size such as 16×8 pixel groups or 8×16 pixel groups.

Figure 2:
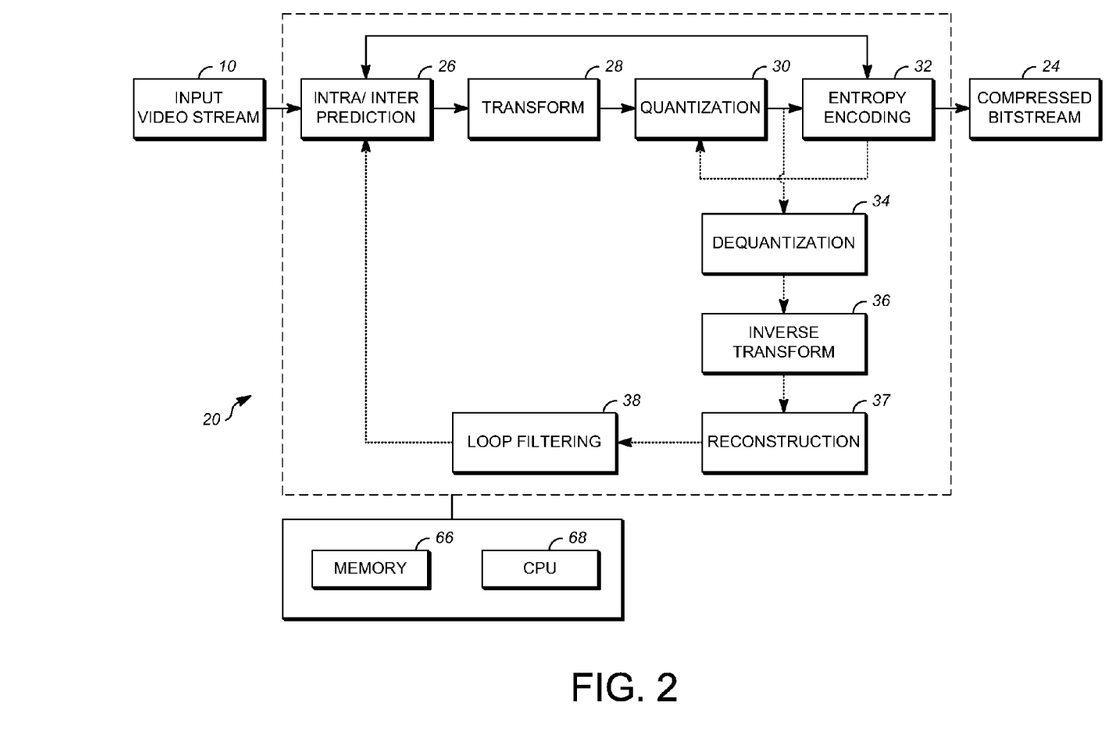
FIG. 2 is a block diagram of a video compression system in accordance with one embodiment.

FIG. 2 is a block diagram of an encoder 20 in accordance with one embodiment. The encoder 20 encodes an input video stream 10. The encoder 20 has the following stages to perform the various functions in a forward path (shown by the solid connection lines) to produce an encoded or a compressed bitstream 24: an intra/inter prediction stage 26, a transform stage 28, a quantization stage 30, and an entropy encoding stage 32. The encoder 20 also includes a reconstruction path (shown by the dotted connection lines) to reconstruct a frame 16 for encoding of further macroblocks 18. The encoder 20 has the following stages to perform the various functions in the reconstruction path: a dequantization stage 34, an inverse transform stage 36, a reconstruction stage 37, and a loop filtering stage 38. Other structural variations of the encoder 20 can be used to encode the input video stream 10.

The stages in the encoder 20 can be implemented by, for example, a computer having an internal configuration of hardware including a memory 66 and a processor such as a central processing unit (CPU) 68. The CPU 68 is connected to the memory 66 by, for example, a memory bus. The memory 66 can be random access memory (RAM) or any other suitable memory device. The memory 66 can store data and program instructions which are used by the CPU 68.

Continuing with FIG. 2, when the input video stream 10 is presented for encoding, each frame 16 within input video stream 10 can be processed in units of macroblocks 18 or by any other arbitrarily sized portion or segment of pixels in the frame. For example, at the intra/inter prediction stage 26, each macroblock 18 can be encoded using either intra-frame prediction (i.e., within a single frame) or inter-frame prediction (i.e. from frame to frame). In either case, a prediction macroblock can be formed. In the case of intra-prediction, the prediction macroblock can be formed from samples in the current frame that have been previously encoded and reconstructed. In the case of inter-prediction, the prediction macroblock can be formed from samples in one or more previously constructed reference frames as described in additional detail herein.

Next, still referring to FIG. 2, the prediction macroblock can be subtracted from the current macroblock at intra/inter prediction stage 26 to produce a residual macroblock (residual). The transform stage 28 transforms the residual into transform coefficients in, for example, the frequency domain. Examples of block-based transforms include the Karhunen-Loève Transform (KLT), the Discrete Cosine Transform ("DCT"), and the Singular Value Decomposition Transform ("SVD"). In one example, the DCT transforms the block into the frequency domain. In the case of DCT, the transform coefficient values are based on spatial frequency, with the zero frequency (i.e. DC) coefficient at the top-left of the matrix and the coefficients representing various other frequencies (AC coefficients) populating the rest of the matrix.

The quantization stage 30 converts the transform coefficients into discrete quantum values, which are referred to as quantized transform coefficients or quantization levels. In an example, the CPU 68 directs the quantization stage 30 to carry out instructions stored in the memory 66 to select among several rounding modes and zero bin configurations, for example, the standard, modified, and second modified bins depicted in, and described in further detail with regard to, FIGS. 5A, 5B, and 5C. The various selectable zero bin configurations may be selected according to a predicted or actual cost of encoding the transform coefficient currently being quantized. The cost may be, for example, how many bits are required to encode a particular transform coefficient or data. Furthermore, spatial characteristics such as frequency and amplitude contained in image data found, for example, in a macroblock of image data such as macroblock 18 of FIG. 1 may be used to select a zero bin size.

The quantized transform coefficients are then entropy encoded by the entropy encoding stage 32. The predicted or actual cost of encoding the transform coefficient as described in the example above may be provided by the entropy encoding stage 32. This predicted or actual cost data may be sent in a feedback path (shown by the dotted connection lines) to quantization stage 30 to prompt dynamic quantizer adjustments, such as zero bin adjustment to further lower cost. The entropy-encoded coefficients, together with the information required to decode the macroblock, such as the type of prediction used, motion vectors and quantizer value, are then output to compressed bitstream 24.

The reconstruction path in FIG. 2 (shown by the dotted connection lines) can be used to ensure that both the encoder 20 and a decoder 42 (described below with reference to FIG. 3) use the same reference frames to decode the compressed bitstream 24. The reconstruction path performs functions that are similar to functions that take place during the decoding process that are discussed in more detail below, including dequantizing the quantized transform coefficients at the dequantization stage 34 and inverse transforming the dequantized transform coefficients at the inverse transform stage 36 to produce a derivative residual macroblock (derivative residual). At reconstruction stage 37, the prediction macroblock that was predicted at the intra/inter prediction stage 26 can be added to the derivative residual to create a reconstructed macroblock. The loop filtering stage 38 can be applied to the reconstructed macroblock to reduce distortion such as blocking artifacts. A reconstruction path in accordance with embodiments of this disclosure can include various modifications to improve the loop filtering process including error testing, thresholding, and selective filtering as disclosed herein.

Other variations of the encoder 20 can be used to encode the compressed bitstream 24. For example, a non-transform based encoder 20 can quantize the residual signal directly without the transform stage 28. In another embodiment, the encoder 20 may have the quantization stage 30 and the dequantization stage 34 combined into a single stage.

The encoding process shown in FIG. 2 can also include two iterations or "passes" of processing the video data. The first pass can be carried out by the encoder 20 using an encoding process that is less computationally intensive which gathers and stores information about the input video stream 10 for use in the second pass. In the second pass, represented as the solid line between the intra/inter prediction stage 26 and the entropy encoding stage 32, the encoder 20 uses this information to optimize a later encoding, the final output of which may be the compressed bitstream 24. For example, the encoder 20 may use this information to select parameters for encoding, locating key-frames, selecting coding modes used to encode macroblocks 18, and allocating the number of bits to each frame. Parameters for encoding such as coding modes, including prediction modes, can also be stored in the memory 66 and used to select a zero bin at the quantization stage 30.

Figure 3:
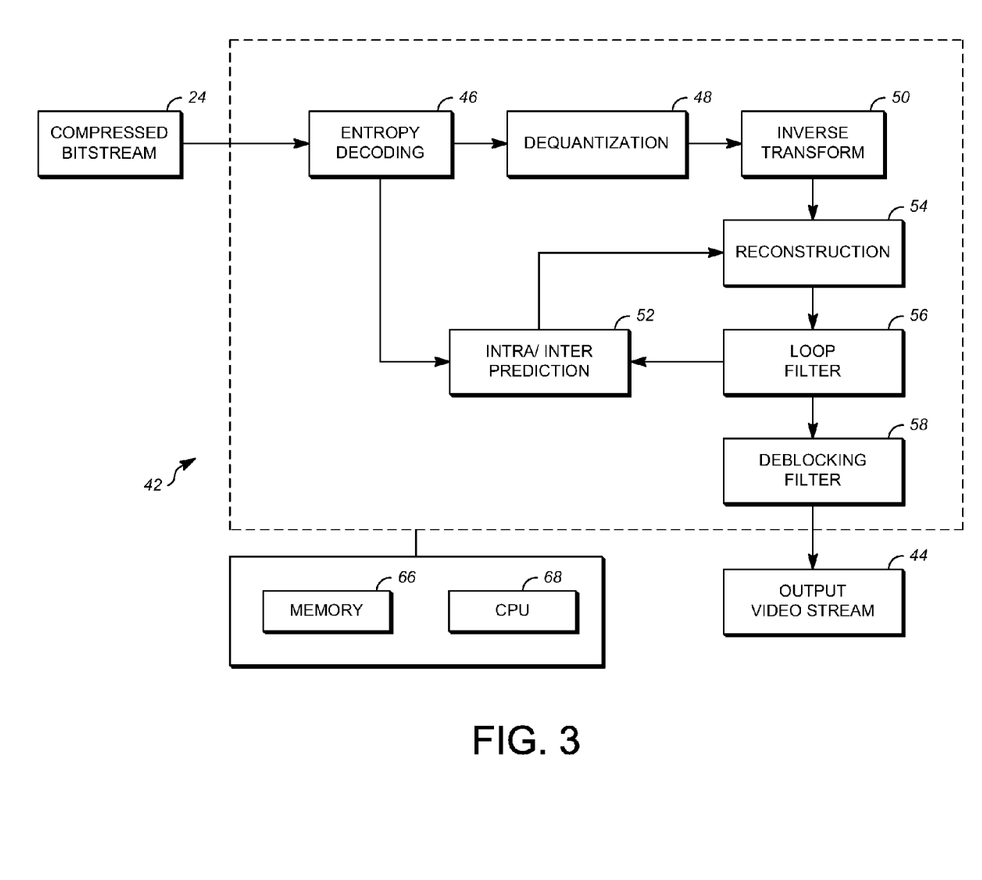
FIG. 3 is a block diagram of a video decompression system in accordance with another embodiment.

FIG. 3 is a block diagram of a decoder 42 in accordance with another embodiment. The decoder 42 decodes the compressed bitstream 24. The decoder 42, similar to the reconstruction path of the encoder 20 discussed previously, includes in an exemplary embodiment the following stages to perform various functions to produce an output video stream 44 from the compressed bitstream 24: an entropy decoding stage 46, a dequantization stage 48, an inverse transform stage 50, an intra/inter prediction stage 52, a reconstruction stage 54, a loop filter stage 56, and a deblocking filter stage 58. Other structural variations of the decoder 42 can be used to decode the compressed bitstream 24. The stages in the decoder 42 can be implemented using, for example, a computer having an internal configuration of hardware including a memory 66 and a processor such as a CPU 68. The memory 66 and CPU 68 depicted in FIG. 3 need not be the same memory and CPU depicted in FIG. 2.

When the compressed bitstream 24 is presented for decoding, the data elements within the compressed bitstream 24 can be decoded by the entropy decoding stage 46 (using, for example, Context Adaptive Binary Arithmetic Decoding) to produce a set of quantized transform coefficients. The dequantization stage 48 dequantizes the quantized transform coefficients, and the inverse transform stage 50 inverse transforms the dequantized transform coefficients to produce a derivative residual that can be identical to that created by the reconstruction stage 54 in the encoder 20. Using header information decoded from the compressed bitstream 24, the decoder 42 can use the intra/inter prediction stage 52 to create the same prediction macroblock as was created in the encoder 20. At the reconstruction stage 54, the prediction macroblock can be added to the derivative residual to create a reconstructed macroblock. The loop filter stage 56 can be applied to the reconstructed macroblock to further reduce blocking artifacts. In order to reconstruct a frame, macroblock, or image segment at the decoder 42 as reconstructed at the encoder 20, the loop filter stage 56 should include the capabilities of the loop filtering stage 38. The deblocking filter stage 58 can be applied to the reconstructed macroblock to reduce blocking distortion, and the result is output as the output video stream 44.

Other variations of the decoder 42 can be used to decode the compressed bitstream 24. For example, the decoder 42 can produce the output video stream 44 without the deblocking filter stage 58.

Figure 4:
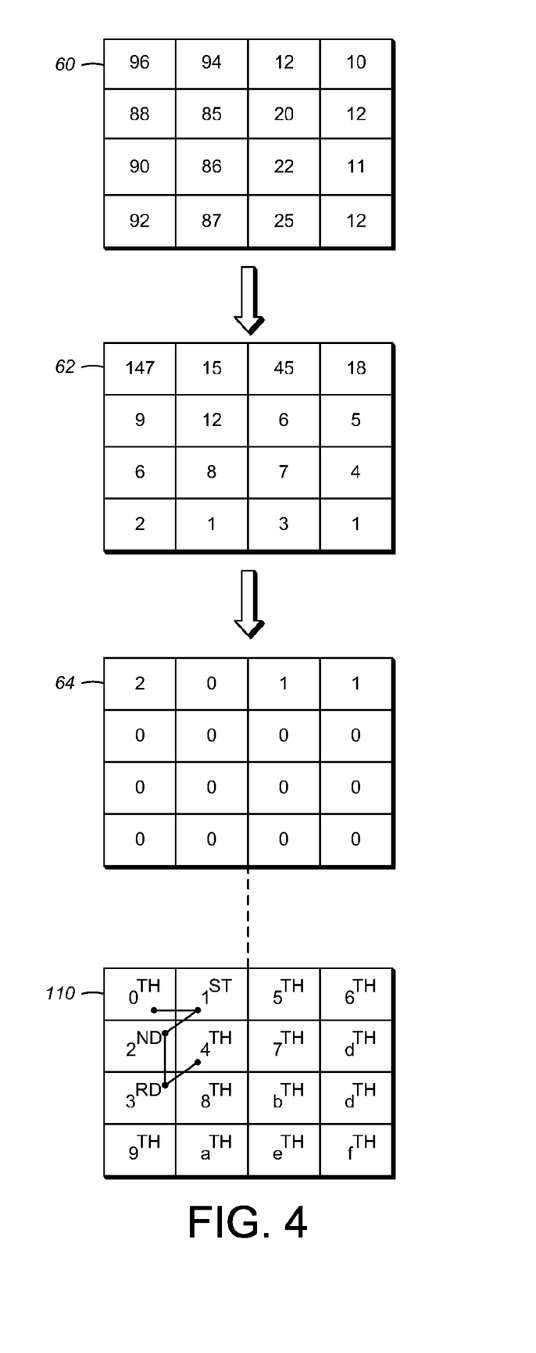
FIG. 4 is a schematic diagram of matrices of pixel data undergoing one embodiment of a method of carrying out a transform and quantization process.

FIG. 4 is a schematic diagram of matrices of image data. The matrices are shown in 4×4 blocks as an example. Other block sizes, such as 8×8 or 16×16, are also possible. In the example shown in FIG. 4, matrix 60 is a 4×4 block of image sample data, such as luminosity or residual values after prediction. Matrix 60 can be found in the input video stream 10 that is accepted as input by the encoder 20. Matrix 62 is an example 4×4 block of coefficients calculated by taking an arbitrary transform of matrix 60. In practice, the transform can be performed using, for example, a DCT that transforms the image data found in matrix 60 into the frequency domain. In this example, matrix 62 could be the output of the transform stage 28 in the encoder 20. Matrix 64 contains the quantized values of the coefficients from matrix 62. Again in this example, matrix 64 could be the output of the quantization stage 30 in the encoder 20.

After the quantization stage 30, the transform coefficients may be re-ordered to group non-zero value coefficients together according to some aspects of a method in accordance with embodiments of this disclosure. The optimum re-ordering path or scan order depends on the distribution of non-zero transform coefficients. The reordering path shown in matrix 110 in FIG. 4 is a zig-zag order starting from the top left coefficient, labeled "$0^{th}$," and ending at the block labeled "fth." The output of this re-ordering process will often result in an array of data values with clusters of non-zero coefficients at the start and a cluster of zero coefficients at the end so that some patterns are more easily recognizable for the entropy encoding stage 32.

An example scan order of the quantized coefficients of matrix 64 is shown in matrix 110. The values of the quantized coefficients have been substituted with ordinal numbers showing each coefficient's place in the scan order. For example, the upper left coefficient is the 0th element of matrix 110, the DC coefficient. The $1^{st}$ and $2^{nd}$ coefficients in the scan order are AC coefficients. The coefficient values shown in FIG. 4 are arbitrary examples and not intended to be actual transform results from any particular transform.

After the re-ordering process, the scanned coefficient values may be sent for entropy encoding at entropy encoding stage 32. Referring again to FIG. 2, the entropy encoding stage 32 may use any number of entropy encoders including Huffman coding, arithmetic coding or context adaptive variable width coding, for example. In general, entropy encoders represent common or frequently used characters with fewer bits and represent uncommon characters with more bits, resulting in fewer bits used in total. Accordingly, within a string of characters, frequently used characters may be considered lower cost and infrequently used characters may be considered higher cost. In many cases, the quantization stage 30 replaces less significant high frequency coefficient values with a series of zero values. This process is depicted in FIG. 4 with the less significant high frequency coefficient values of matrix 62 being replaced with a series of zero values in matrix 64.

Although in one embodiment, a re-ordered array of data from the quantization stage 30 is sent to the entropy encoding stage 32, many other data inputs can be sent to the entropy encoding stage 32 including motion vectors, frame data, macroblock header information, or any other data derived from input video stream 10 or related to the operation of encoder 20.

Figure 6A:
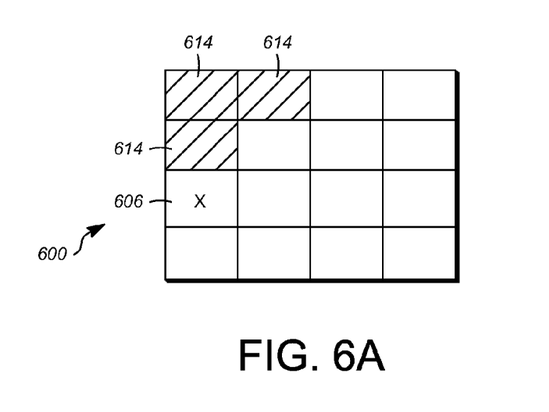
FIG. 6A is diagram of a first embodiment of an encoding context.
Figure 6B:
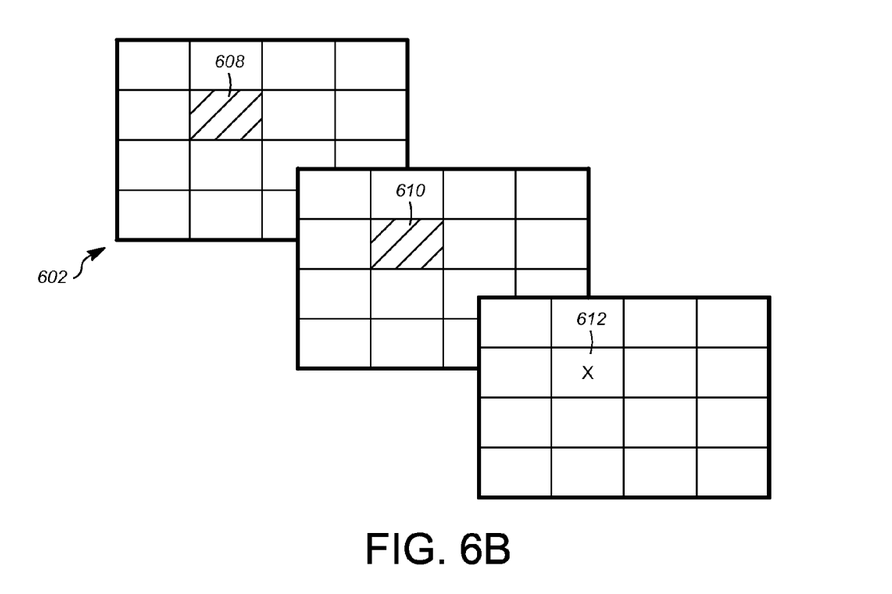
FIG. 6B is a diagram of a second embodiment of an encoding context.

FIGS. 6A and 6B show example encoding contexts 600 or 602 that may also be sent to the entropy encoding stage 32. The encoding contexts 600 and 602 inform a context model stage 702 shown in FIG. 7 of recently coded values relevant to the value currently being coded. For example, with respect to the encoding context 600 in FIG. 6A, the value currently being coded is the coefficient 606, while the shaded blocks are the previously coded coefficients 614 within the same frame. As another example, with respect to the encoding context 602 in FIG. 6B, the value currently being coded is the coefficient 612, while the shaded blocks 608 and 610 are previously coded coefficients in neighboring blocks. Because there is correlation between previously coded coefficients in close proximity to a currently coded coefficient in the same block or corresponding coefficients in neighboring blocks, these previously coded coefficients can be used to predict the value of the currently coded coefficient. Accordingly, context model stage 702 can estimate the probability that the currently coded coefficient 606 or 612 is a non-zero value as opposed to a zero value, for example, by using algorithms, data tables, mathematical models, or other processes.

Figure 7:
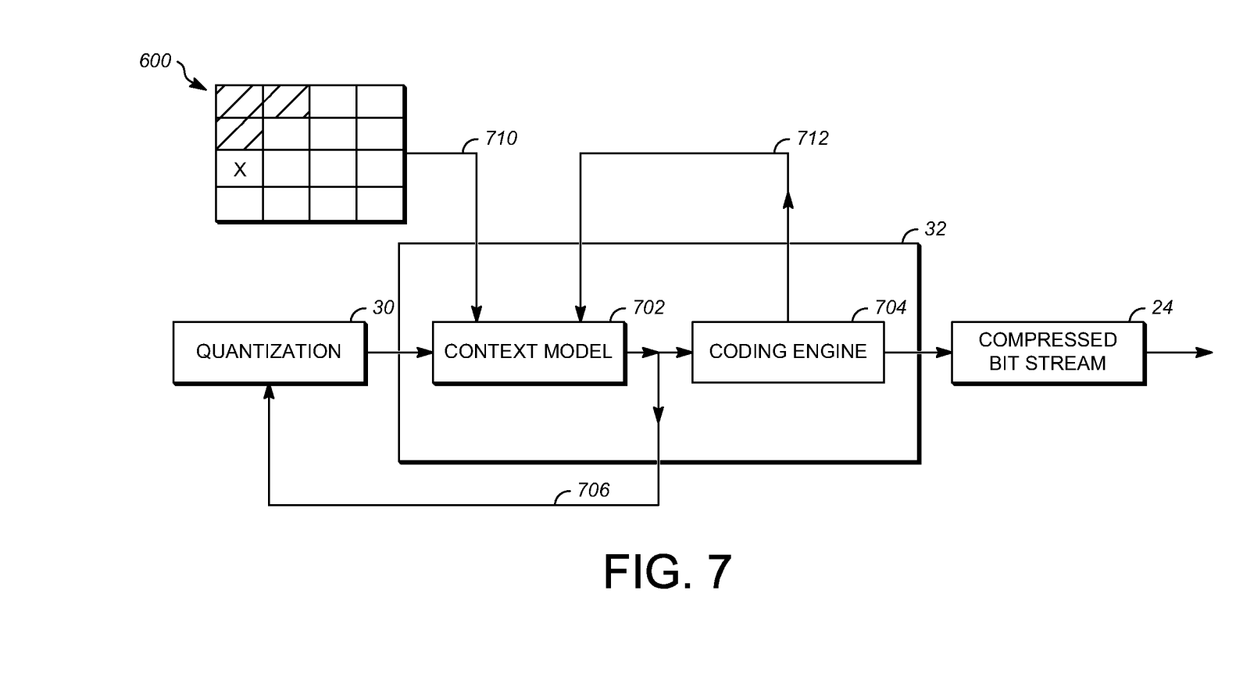
FIG. 7 is a more detailed schematic diagram of one type of encoder in accordance with embodiments of this disclosure.

In FIGS. 6 and 7, one aspect of a disclosed system and method describing the context model stage 702 includes several algorithms or probability models that can be selected depending on an encoding context 710 such as the previously coded coefficients 608, 610, or 614 in the shaded blocks. For example, the encoding context 600 contains intra-frame coefficient data. If the encoding context 600 is selected as the encoding context 710 as shown in FIG. 7, the context model stage 702 analyzes the nearby previously coded coefficients 614 in the same frame to determine probability data to be sent to a coding engine 704. If the encoding context 602 is selected as the encoding context 710, the context model stage 702 analyzes the previously coded coefficients 608 and 610 inter-frame to determine probability data to be sent to the coding engine 704. Different encoding contexts may be selected depending on a number of factors including the type of data being coded such as motion vectors, frame data, macroblock header information, or any other data derived from input video stream 10 or related to the operation of encoder 20.

The coding contexts 600 and 602 may be analyzed to determine if the included coefficients have high or low magnitude data. In one exemplary embodiment, if previously coded coefficients have low magnitude data, a first probability model can be selected at the context model stage 702 to predict whether the currently coded coefficient 606 or 612 is a zero or nonzero value. Alternatively, if previously coded coefficients have high magnitude data, a second probability model may be selected at the context model stage 702 to determine a cost for the currently coded coefficient 606 or 612 with an encoder dependent algorithm, calculation, or process. The cost can include the cost for coding the currently coded coefficient 606 or 612 as a zero as well as the cost for coding the currently coded coefficient 606 or 612 as non-zero.

Figure 8:
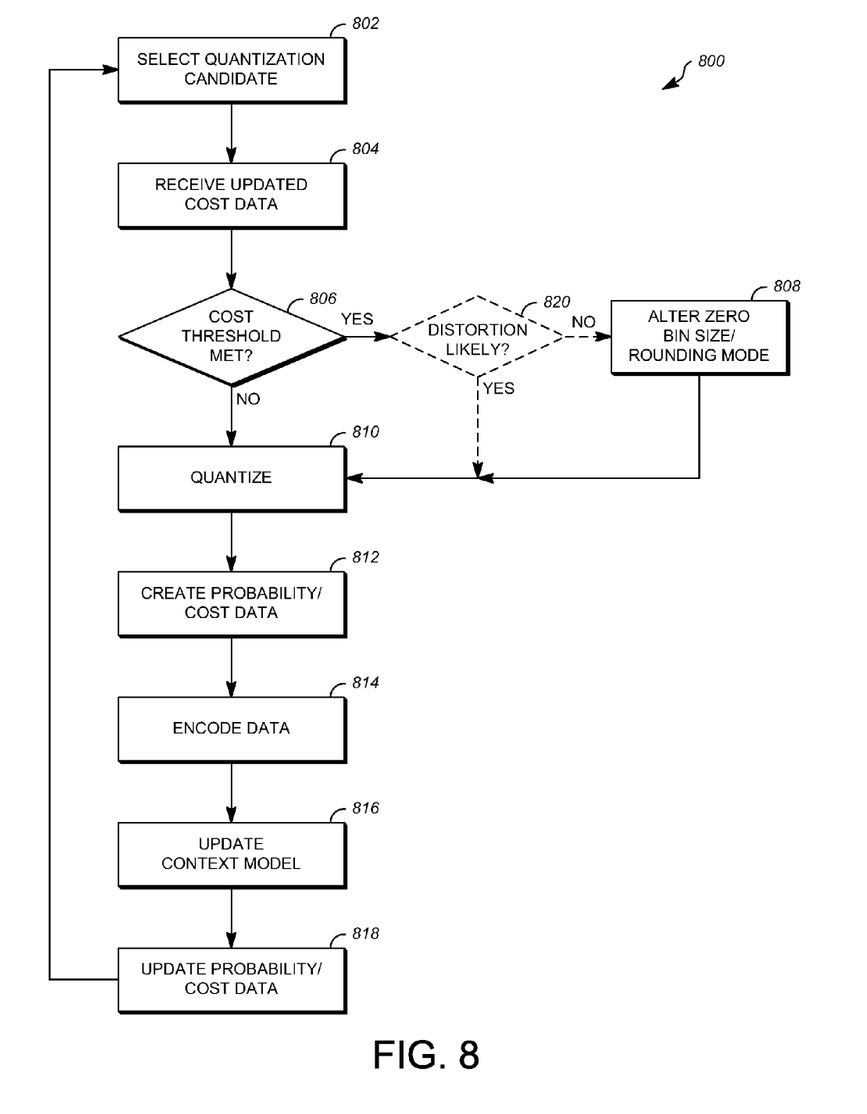
FIG. 8 is a flow chart of a method in accordance with embodiments of this disclosure.

In the exemplary embodiment shown in FIG. 7, the probability model and/or cost data is sent to the coding engine 704 to encode the currently coded coefficient 606 or 612. Once the currently coded coefficient 606 or 612 is coded at the coding engine 704, it is sent into the compressed bitstream 24. Additionally, updated coding information can be sent (e.g., each time data is coded) from the coding engine 704 in a feedback loop 712 to the context model stage 702 to update the selectable probability models to determine updated cost data. The updated cost data can be sent to quantization stage 30 via communication 706 for quantizer optimization such as zero bin alterations or rounding mode alterations as shown in FIG. 8 and described below. FIG. 7 is an exemplary non-limiting depiction of one embodiment of a disclosed system and method. The order of the various stages and placement of communications between those stages are may vary and remain within the scope of this disclosure.

FIG. 8 depicts an exemplary process 800 for altering the zero bin width or rounding mode of the quantization stage 30 depending on coding cost data received from the context model stage 702 depicted in FIG. 7. In one embodiment, each transform coefficient in a matrix of transform coefficients, such as those shown in the matrix 62 depicted in FIG. 4, has a separate quantizer zero bin width and rounding mode setting. For example, the process 800 may be applied on a coefficient by coefficient basis within a given macroblock or on a macroblock by macroblock basis in a given frame. Accordingly, at step 802, a quantization candidate such as coefficient 606 or 612 is selected. Alternatively at step 802, an entire macroblock 18 or other segment of data within a frame 16 may be selected as a quantization candidate. At step 804, the updated coding cost data is received at quantization stage 30. At step 806, the cost data is checked against a cost threshold to determine if a rounding mode or zero bin alteration will occur for the candidate coefficient 606 or 612.

With respect to entropy encoders, because more common characters in a given array of data are coded with less bits and more uncommon characters in a given array of data are coded with more bits, a series of common characters, such as a continuous series of zero values can indicate a lower coding cost. If the three previously coded coefficients 614 in encoding context 600 are, for example, a series of zero values, the cost for coding the candidate coefficient 606 as a zero may drop below a predetermined cost threshold. In an exemplary embodiment, if the cost of coding a zero falls below a predetermined threshold at 806, quantization stage 30 will increase the width of the zero bin or alter the rounding mode to round more coefficients toward zero. Accordingly, for coefficients predicted to have a low cost if coded as a zero, the process 800 increases the likelihood that such coefficients will be coded as a zero thereby efficiently compressing the bitstream 24 in a selective and cost dependent manner.

Figure 5A:
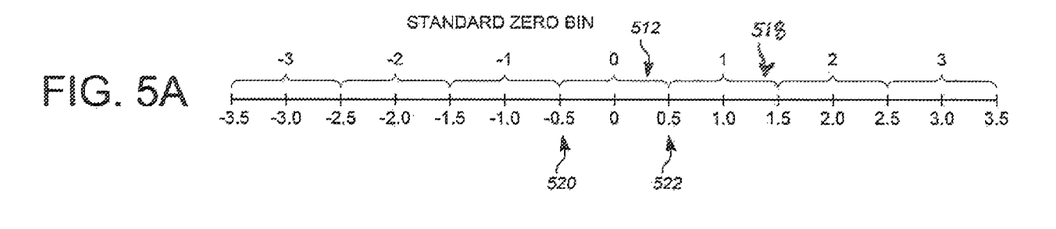
FIGS. 5A-5C are diagrams of variations of a quantizer zero bin.
Figure 5B:
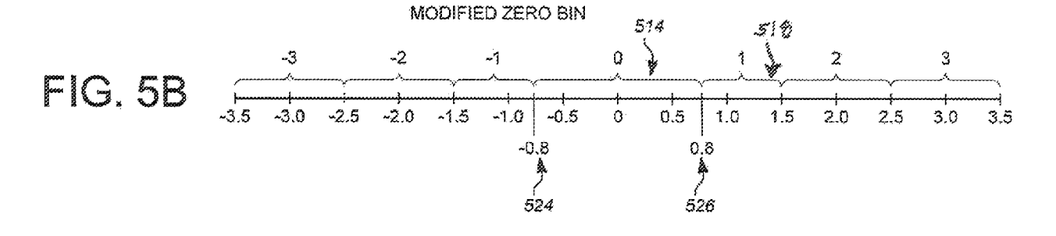
Figure 5C:
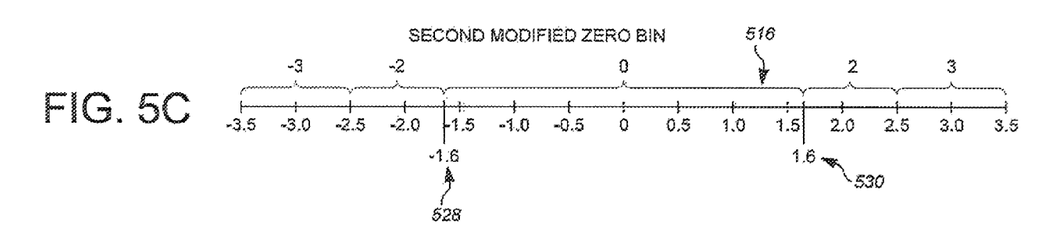

FIGS. 5A-5C provides examples of the different sizes of zero bins of quantization stage 30 that can be selected to process transform coefficients. FIG. 5A illustrates a standard zero bin 512. FIG. 5B illustrates a modified zero bin 514. FIG. 5C illustrates a second modified zero bin 516. The standard zero bin 512 includes the integer zero. Bins that include zero are referred to as "zero bins." Other bins may include non-zero integers but do not include zero. Such bins are referred to as "non-zero" bins, and an example, non-zero bin 518, is shown in FIGS. 5A and 5B.

The boundaries or range of each bin are defined by its upper and lower limit. For example, the lower limit 520 of the standard zero bin 512 is about −0.5 and the upper limit 522 of the standard zero bin 512 is about 0.5. Thus, the standard zero bin 512 has a range or width of between about −0.5 to about 0.5. In another example, the lower limit 524 of the modified zero bin 514 is about −0.8 and the upper limit 526 of the modified zero bin 514 is about 0.8. Thus, the modified zero bin 514 has a range or width of between about −0.8 to about 0.8. In a third example, the lower limit 528 of the second modified zero bin 516 is about −1.6 and the upper limit 530 of the second modified zero bin 516 is about 1.6. Thus, the second modified bin 516 has a range or width of between about −1.6 and about 1.6. The specific range values for zero bins 512, 514, and 516 are exemplary only. Different values can be used depending upon the implementation. The wider the zero bin, the more transform coefficient values will tend to fall into that zero bin. Further, a zero-bin expansion can reduce the size of a neighboring non-zero bin. For example, modified zero bin 514 in FIG. 5B is wider than standard zero bin 512 in FIG. 5A. Consequently, the non-zero bin 518 decreases in width as shown in the difference in width of non-zero bin 518 in FIGS. 5A and 5B. In the case of the second modified zero bin 516 in FIG. 5C, the expansion of the zero bin has overtaken the neighboring non-zero bins such that the non-zero bin 518 is not present in FIG. 5C.

When the quantization stage 30 performs divisions on the transform coefficients, the resulting data is rounded or truncated to an integer based on which zero or non-zero bin the data falls into. Transform coefficient values that fall on a bin boundary or limit (such as 0.5 for example) may be rounded up or truncated down to either adjacent integer bin. In the case of the standard zero bin 512, transform coefficients falling within the limits of the zero bin are set to zero.

Returning to FIG. 8, in one aspect of a disclosed method, the cost threshold at step 806 may be a series of thresholds corresponding to a series of zero bin widths that will be altered at step 808. Alternatively, step 806 may have a single threshold that if met in successive iterations of the process 800 will indicate to step 808 to increase the zero bin width in successive iterations. Some embodiments of the process 800 can determine if the zero bin or rounding mode alterations will likely lead to undesirable distortion, e.g., at step 820. Step 820 may take account of characteristics of a coefficient such as amplitude, frequency, or both to determine if distortion is likely. For example, increasing the zero bin of a low frequency coefficient may more severely affect image distortion. Accordingly, step 820 may prevent alteration of a zero bin for a particular coefficient or set of coefficients in the case that those coefficients are below a frequency and/or amplitude threshold. Step 820 may also make such determination on other data that indicates distortion is likely.

Figure 9A:
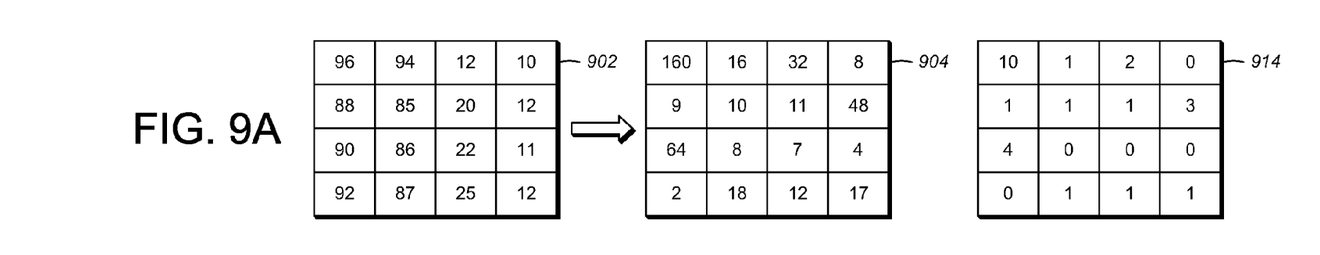
FIGS. 9A-9C are diagrams of the results of different zero bin applications.
Figure 9B:
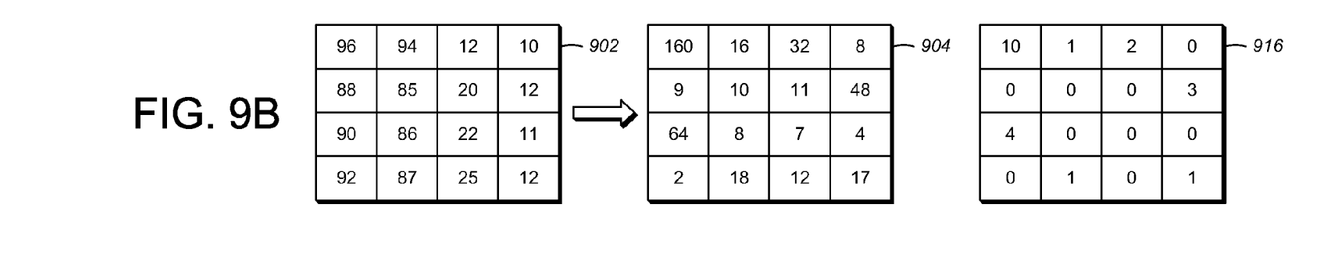
Figure 9C:
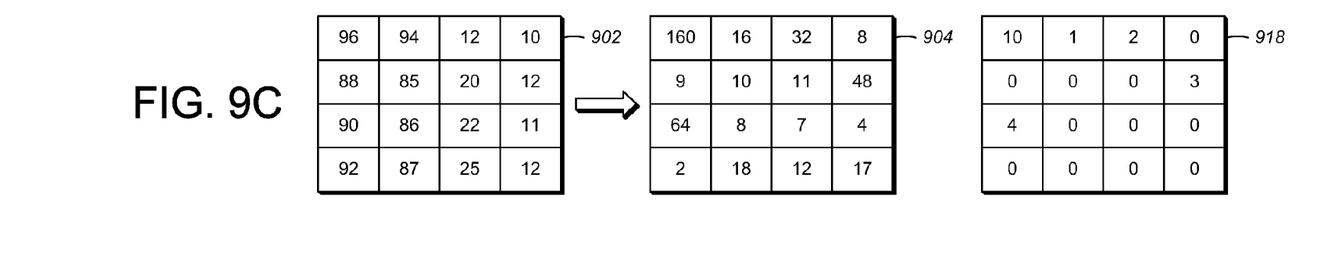

Referring to step 808, increasing the width of the zero bin increases the range of transform coefficients that can fall within the limits of the zero bin. FIGS. 9A, 9B, and 9C show examples of the results of different zero bin applications to matrices of transform coefficients. Matrix 902 is a 4×4 block of image sample data, such as luminosity or residual values after prediction. Matrix 904 is an example 4×4 block of coefficients calculated by taking an arbitrary transform of matrix 902. Matrix 914 depicts the application of a zero bin (such as standard zero bin 512) to the transform coefficients contained in matrix 904 occurring at quantizing step 810 of FIG. 8. Matrices 916 and 918 depict an alternate application of the modified and second modified zero bins 514 and 516 to the same matrix 904 occurring at step 810 of FIG. 8. The end result of expanding the zero bin during quantization can be seen by an increase in the amount of zero values when comparing matrix 914 to 916 and then again from matrix 916 to 918.

Referring again to FIG. 8, once the coefficient or a series of coefficients have been quantized at step 810, they are communicated to an entropy encoder, e.g., entropy encoder 20 shown in FIG. 2. A more detailed view of an entropy encoder 20 is shown in FIG. 7. The context model stage 702 receives an encoding context 710 to determine the probability that the next coded value will be a zero or non-zero value. This probability can further be used to determine a coding cost for the next coefficient to be coded at step 812. At step 814, the next coefficient or coefficients are encoded according to the probabilities determined from the selected context model at context model stage 702. Furthermore, once the current coefficient is coded at the coding engine 704, the coding engine 704 may update the context model stage 702 at step 816 with feedback loop 712 for a more accurate probability determination and cost estimate for future coded coefficients. At 818, the updated probability and cost data is sent to the quantization stage 30 by the communication 706 and the process 800 is repeated with a new quantization candidate starting at step 802. According to some embodiments, steps 816 and 818 can be performed once per frame, once per coefficient, or at any other predetermined interval depending on the processing time desired.

The above-described embodiments of encoding or decoding illustrate some exemplary encoding techniques. However, it shall be understood that encoding and decoding consistent with embodiments of this disclosure may include other transformations or change of data.

The embodiments of encoder 20 and/or decoder 42 (and the algorithms, methods, instructions etc. stored thereon and/or executed thereby) can be realized in hardware, software, or any combination thereof. The hardware can include, for example, intellectual property cores (IPs), application-specific integrated circuits (ASICs), programmable logic arrays, optical processors, programmable logic controllers, microcode, microcontrollers, servers, microprocessors, digital signal processors or any other suitable circuit. In the claims, the term processor should be understood as encompassing any of the foregoing hardware, either singly or in combination. The terms "signal" and "data" are used interchangeably.

Further, portions of the encoder 20 and the decoder 42 may be implemented in different formats and still remain within the scope of this disclosure. For example, the quantization stage 30 may be implemented primarily using software whereas the entropy encoding stage 32 may be implemented primarily using hardware. In one embodiment, for example, the encoder 20 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The encoder 20 may be implemented in a transmitting station and the decoder 42 may be implemented at a receiving station. The transmitting station can be implemented on a server and the receiving station can be implemented on a device separate from the server, such as a hand-held communications device (i.e. a cell phone) or a set top box. The transmitting station can encode content using the encoder 20 into compressed bitstream 24 and transmit the compressed bitstream 24 to the communications device. In turn, the communications device can then decode the compressed bitstream 24 using the decoder 42. Alternatively, the communications device can decode content stored locally on the communications device, i.e., content that was not transmitted by the transmitting station. Other suitable transmitting station and receiving station implementation schemes are available. For example, the receiving station can be a generally stationary personal computer rather than a portable communications device and/or a device including an encoder 20 may also include a decoder 42.

Further, all or a portion of embodiments of the present invention can take the form of a computer program product accessible from, for example, a computer-usable or computer-readable medium. A computer-usable or computer-readable medium can be any device that can, for example, contain, store, communicate, or transport the program for use by or in connection with any computing system or device. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law. Further, reference to "an embodiment" or "one embodiment" throughout does not necessarily refer to the same embodiment unless otherwise expressed.

What is claimed is:

1. A method for encoding a video signal having a plurality of frames, comprising:
transforming at least a portion of a video signal to produce matrices of transform coefficients;
dividing the transform coefficients by at least one quantizer value to generate matrices of quantized transform coefficients;
identifying an encoding context including the transformed portion of the video signal, the encoding context including a plurality of recently coded values;

determining a cost to entropy encode at least one of a zero value or non-zero value occurring within the encoding context as a zero value based on a probability that a next coded value will be a zero value, wherein the probability is determined using the plurality of recently coded values from the encoding context;

using a processor to increase a width of a first range including zero if the cost to entropy encode is less than a threshold value;

setting to zero at least one quantized transform coefficient that falls within the first range; and encoding the quantized transform coefficients.

2. The method of claim 1, wherein determining the cost to entropy encode at least one of a zero value or non-zero value is performed separately for at least two of the quantized transform coefficients within a matrix of transform coefficients.

3. The method of claim 1, wherein the identified encoding context includes a plurality of spatially correspondent transform coefficients.

4. The method of claim 3, wherein the plurality of spatially correspondent transform coefficients reside in spatially correspondent blocks in different frames within the plurality of frames.

5. The method of claim 1, wherein the encoding context resides only in the frame from which the at least one transform coefficient is derived.

6. The method of claim 1, wherein the encoding context resides in at least one frame other than a frame in which the transformed portion of the video signal resides.

7. The method of claim 1, wherein the width of the first range is positively correlated with the cost of encoding a non-zero value.

8. The method of claim 1, wherein the determined cost is an estimate of bit cost.

9. The method of claim 8, wherein the estimate is based upon quantized transform coefficients residing in at least one frame preceding the frame in which the transformed portion of the video signal resides.

10. The method of claim 1, wherein the width of the first range is increased to a value that is a function of at least a spatial frequency characteristic of the encoding context.

11. The method of claim 1, wherein the width of the first range is increased to a value that is a function of at least an amplitude characteristic of the encoding context.

12. The method of claim 1, further comprising: determining a second range including a non-zero integer with an absolute value greater than any integer included in the first range, the second range having a width; and setting to the non-zero integer those quantized transform coefficients that fall within the second range.

13. The method of claim 12, wherein the first range is initially the same width as the second range; and the width of the first range is increased to a width greater than the second range based on at least the determined cost to entropy encode.

14. The method of claim 12, wherein the width of the first range is decreased based on at least the determined cost to entropy encode.

15. The method of claim 1, wherein the cost to entropy encode is determined by a probability based on the plurality of recently coded values from the encoding context.

16. The method of claim 13, wherein increasing the width of the first range does not alter the upper limit of the second range.

17. An apparatus for encoding a video signal comprising:
a memory; and
a processor coupled to the memory, the processor configured to execute instructions stored in the memory to:
transform at least a portion of the video signal to produce matrices of transform coefficients;
divide the transform coefficients by at least one quantizer value to generate matrices of quantized transform coefficients;
identify an encoding context including the transformed portion of the video signal, the encoding context including a plurality of recently coded values;
determine a cost to entropy encode a non-zero value occurring within the encoding context as a zero value based on a probability that a next coded value will be a zero value, wherein the probability is determined using the plurality of recently coded values from the encoding context;
increase a width of a first range including zero if the cost to entropy encode is less than a threshold value; and
set to zero at least one transform coefficient that falls within the first range.

18. The apparatus of claim 17, wherein determining the cost to entropy encode a non-zero value is performed separately for at least two transform coefficients within a matrix of transform coefficients.

19. The apparatus of claim 17, wherein the width of the first range is positively correlated with the cost of encoding a non-zero value.

20. A system for encoding a video signal comprising:
means for transforming at least a portion of the video signal to produce matrices of transform coefficients;
means for dividing the transform coefficients by at least one quantizer value to generate matrices of quantized transform coefficients;
means for identifying an encoding context including the transformed portion of the video signal, the encoding context including a plurality of recently coded values;
means for determining a cost to entropy encode at least one of a zero value and a non-zero value occurring within the encoding context as a zero value based on a probability that a next coded value will be a zero value, wherein the probability is determined using the plurality of recently coded values from the encoding context;
means for increasing a width of a first range including zero if the cost to entropy encode is less than a threshold value; and
means for setting to zero at least one transform coefficient that falls within the first range.

* * * * *